US008233555B2

(12) United States Patent
Naguib et al.

(10) Patent No.: US 8,233,555 B2
(45) Date of Patent: Jul. 31, 2012

(54) TIME VARYING DELAY DIVERSITY OF OFDM

(75) Inventors: Ayman Fawzy Naguib, Cupertino, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 878 days.

(21) Appl. No.: 11/078,176

(22) Filed: Mar. 10, 2005

(65) Prior Publication Data

US 2005/0254592 A1 Nov. 17, 2005

Related U.S. Application Data

(60) Provisional application No. 60/572,137, filed on May 17, 2004.

(51) Int. Cl.
*H04L 1/02* (2006.01)
(52) U.S. Cl. ......................................... 375/267; 375/299
(58) Field of Classification Search .................. 375/260, 375/267, 347, 348, 299; 455/562.1, 101, 455/103
See application file for complete search history.

(56) References Cited

U.S. PATENT DOCUMENTS

| | | | |
|---|---|---|---|
| 4,513,412 A | 4/1985 | Cox | |
| 6,377,632 B1 * | 4/2002 | Paulraj et al. ................. | 375/299 |
| 6,771,706 B2 | 8/2004 | Ling et al. | |
| 6,785,341 B2 | 8/2004 | Walton et al. | |
| 6,842,487 B1 * | 1/2005 | Larsson ......................... | 375/260 |
| 6,961,388 B2 | 11/2005 | Ling et al. | |
| 7,006,848 B2 | 2/2006 | Ling et al. | |
| 2002/0122381 A1 * | 9/2002 | Wu et al. ......................... | 370/208 |
| 2002/0154705 A1 | 10/2002 | Walton et al. | |
| 2003/0137926 A1 * | 7/2003 | Joo et al. ......................... | 370/203 |
| 2005/0105631 A1 * | 5/2005 | Giannakis et al. ............. | 375/267 |
| 2006/0221898 A1 * | 10/2006 | Bossert et al. ................. | 370/330 |
| 2009/0141620 A1 * | 6/2009 | Hwang et al. .................. | 370/210 |
| 2010/0022193 A1 * | 1/2010 | Melis et al. ...................... | 455/73 |
| 2010/0322349 A1 * | 12/2010 | Lee et al. ....................... | 375/299 |
| 2011/0001579 A1 * | 1/2011 | Boffa et al. .................... | 333/159 |

FOREIGN PATENT DOCUMENTS

| | | |
|---|---|---|
| EP | 1065855 A1 | 1/2001 |
| EP | 1073214 | 1/2001 |
| EP | 1757001 | 8/2010 |
| JP | 06169273 | 6/1994 |

(Continued)

OTHER PUBLICATIONS

Armin Dammann and Stefan Kaiser, "Transmit/Receive-Antenna Diversity Techniques for OFDM Systems", German Aerospace Center, vol. 13, No. 5 Sep.-Oct. 2002.*

(Continued)

*Primary Examiner* — Aristocratis Fotakis
(74) *Attorney, Agent, or Firm* — Dmitry R. Milikovsky; Howard H. Seo

(57) ABSTRACT

Methods and apparatuses that apply a time-varying delay to symbols to be transmitted from one or more antennas are provided. One such method may include providing a first symbol comprising a first plurality of samples to a first antenna. The first symbol is provided to a second antenna after a first delay period. A second symbol comprising a second plurality of samples is provided to the first antenna. The second symbol is provided to the second antenna after a second delay period that is different than the first delay period.

26 Claims, 10 Drawing Sheets

FOREIGN PATENT DOCUMENTS

| | | |
|---|---|---|
| JP | 08265244 | 10/1996 |
| JP | 2001102976 | 4/2001 |
| JP | 2004502376 | 1/2004 |
| JP | 2004064654 A | 2/2004 |
| KR | 20040028111 | 4/2004 |
| WO | 0201732 | 1/2002 |
| WO | 0245293 | 6/2002 |
| WO | 04002010 | 12/2003 |

OTHER PUBLICATIONS

Stefan Kaiser, "Spatial Transmit Diversity Techniques for Broadband OFDM Systems", German Aerospace Center, 2000 IEEE.*

Dammann, A., Kaiser, S.,"Standard conformable antenna diversity techniques for OFDM and its application to the DVB-T system", German Aerospace Center, 2001 IEEE.*

Hiroike, A., Adachi, F., Nakajima, N., "Combined effects of phase sweeping transmitter diversity and channel coding", NTT Radio Communication Systems Laboratories, Kanagawa, Japan, 1992 IEEE.*

Simon Plass, Armin Dammann, Gerd Richter and Martin Bossert, Resulting Channel Characteristics from Time-Varying Cyclic Delay Diversity in OFDM, German Aerospace Center (DLR) and Ulm University, Germany, IEEE 2007.*

R1-062302, Time varying CDD/CSD, Siemens, 3GPP TSG RAN WG1 LTE, Tallinn, Estonia, Aug. 28 to Sep. 1, 2006.*

Bauch et al "Orthogonal Frequency Division Miltiple Access with Cyclic Delay Diversity" IEEE (2004).

Dammann, et al., "Standard Conformable Antenna Diversity Techniques for OFDM and its Application to the DVB-T System," GLOBECOM '01, IEEE Global Telecommunications Conference, 2001, vol. 5, Nov. 25-29, 2001, pp. 3100-3105.

Spilker, "Digital Satellite Communications," Moscow, Publishing House "Communication," 1979, p. 278, 242.

Viswanath, et al., "Opportunistic Beamforming Using Dumb Antennas," IEEE Transactions on Information Theory, vol. 48, Issue 6, Jun. 2002, pp. 1277-1294.

"Discrete Message Transmission," ed. by V.P. Shuvalov, Moscow, Radio and Communication, 1990, pp. 44-45.

"Radio Transmitters," ed. by Blagoveshenskiy, M.V., and Utkin, G.M., Moscow, Radio and Communication, 1982, pp. 336-339.

International Search Report—PCT/US05/015041, International Search Authority—European Patent Office, Aug. 22, 2005.

Written Opinion—PCT/US05/015041, International Searching Authority—European Patent Office, Aug. 22, 2005.

International Preliminary Report on Patentability—PCT/US05/015041, The International Bureau of WIPO—Geneva, Switzerland, Nov. 21, 2006.

Kaiser, "Spatial transmit diversity techniques for broadband OFDM systems", German aerospace center publisher, 2000 IEEE Global Telecommunications Conference, GLOBECOM, vol. 3, pp. 1824-1828.

Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.

* cited by examiner

TIME VARYING DELAY DIVERSITY OF OFDM

CROSS REFERENCE

This application claims priority from Provisional Application No. 60/572,137, filed May 17, 2004, entitled "Systems Time Varying Cyclic Delay Diversity of OFDM" and is assigned to the assignee of the present application.

BACKGROUND

1. Field

The present document relates generally to wireless communication, and amongst other things to, signal transmission in multi-antenna system.

2. Background

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

If the propagation paths between the transmit and receive antennas are linearly independent (i.e., a transmission on one path is not formed as a linear combination of the transmissions on the other paths), which is generally true to at least an extent, then the likelihood of correctly receiving a data transmission increases as the number of antennas increases. Generally, diversity increases and performance improves as the number of transmit and receive antennas increases To further improve the diversity of the channels a transmit diversity technique may be utilized. Many transmit diversity techniques have been explored. One such technique is transmit delay diversity. In transmit delay diversity a transmitter utilizes two antennas that transmit the same signal, with the second antenna transmitting a delayed replica of that transmitted by the first antenna. By so doing, the second antenna creates diversity by establishing a second set of independent multipath elements that may be collected at the receiver. If the multipath generated by the first transmitter fades, the multipath generated by the second transmitter may not, in which case an acceptable Signal-To-Noise Ratio (SNR) will be maintained at the receiver. This technique is easy to implement, because only the composite TX0+TX1 channel is estimated at the receiver. The biggest drawback to transmit delay diversity is that it increases the effective delay spread of the channel, and can perform poorly when the multipath introduced by the second antenna falls upon, and interacts destructively with, the multipath of the first antenna, thereby reducing the overall level of diversity.

To deal with standard delay diversity problems, additional delay diversity techniques have been developed. One such technique is referred to as cyclic delay diversity. A cyclic delay is one where the samples of each symbol of the $n_i$ symbols are shifted in the order in which they are transmitted as part of the symbol. Those samples that are beyond the effective part of the symbol are transmitted in the beginning of that symbol. In such a technique, a prefix is pre-pended to each sample that fixes a delay, or order, for transmitting the sample from the specific antenna as part of the symbol. The cyclic delays allow for longer delays, however, which would otherwise be limited to fractions of the guard interval period to avoid inter-symbol interference.

A cyclic delay diversity scheme may introduce frequency selectivity in the channel and hence may provide diversity benefit for flat channels. It does not provide, however, any time diversity when the channel is not in and of itself time selective. For example, if two transmit antennas are in slow fading or static channels, the cyclic shift $\Delta_m$ may be such that the two channels, e.g. $H_1(n)$ and $H_2(n)$, add up destructively (or constructively) all the time.

Therefore, it is desired to provide a delay diversity scheme which minimizes the possibility of destructive or constructive addition of the channels utilized to provide diversity.

SUMMARY

In one aspect, a method for providing transmission diversity comprises providing, to a first antenna, a first symbol after a first delay period, providing, to the first antenna, a second symbol after a second delay period that is different than the first delay period, and providing, to the first antenna, a third symbol after a third delay period that is different than the first delay period and the second delay period.

In another aspect, a transmitter comprises at least two antennas, a modulator, and a delay circuit that delays symbols output from the modulator to the antenna by a delay period that varies over time.

In an additional aspect, a wireless transmitter comprises at least two antennas and a that stores a plurality of symbols each comprising a plurality of samples, wherein the memory outputs the plurality of samples of a first symbol after a first delay to one antenna of the at least two antennas and a second symbol of the plurality of symbols after a second delay to the one antenna. The first delay and the second delay are different.

In a further aspect, a transmitter comprises at least three antennas, a modulator, a first delay circuit coupled between the modulator and one of the at least two antennas, the first delay circuit delaying symbols output from the modulator to the antenna by a delay period that varies over time, and a second delay circuit coupled between the modulator and another of the at least two antennas, the first delay circuit delaying symbols output from the modulator to the another antenna by a another delay period that varies over time. The another delay period and the delay period are different.

In yet another aspect, a method for providing transmission diversity in a multi-channel communication system comprises applying a first phase shift to a first symbol to be transmitted on a first antenna and applying a second phase shift, different than the first phase shift, to the first symbol to be transmitted on a second antenna.

In yet a further aspect, a transmitter comprises at least two antennas, a modulator, and a phase shift that applies a phase shift to symbols output by the modulator to the antenna by a phase shift that varies over time.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of exemplary embodiments and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Multi-channel communication systems include multiple-input multiple-output (MIMO) communication systems, orthogonal frequency division multiplexing (OFDM) communication systems, MIMO systems that employ OFDM (i.e., MIMO-OFDM systems), and other types of transmissions. For clarity, various aspects and embodiments are described specifically for a MIMO system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or transmission channel) of the MIMO channel. The number of spatial subchannels is determined by the number of eigenmodes for the MIMO channel, which in turn is dependent on a channel response matrix, H, that describes the response between the $N_T$ transmit and $N_R$ receive antennas. The elements of the channel response matrix, H, are composed of independent Gaussian random variables $\{h_{i,j}\}$, for i=1, 2, ... $N_R$ and j=1, 2, ... $N_T$, where $h_{i,j}$ is the coupling (i.e., the complex gain) between the j-th transmit antenna and the i-th receive antenna. For simplicity, the channel response matrix, H, is assumed to be full-rank (i.e., $N_S = N_T \leq N_R$), and one independent data stream may be transmitted from each of the $N_T$ transmit antennas.

Figure 1:
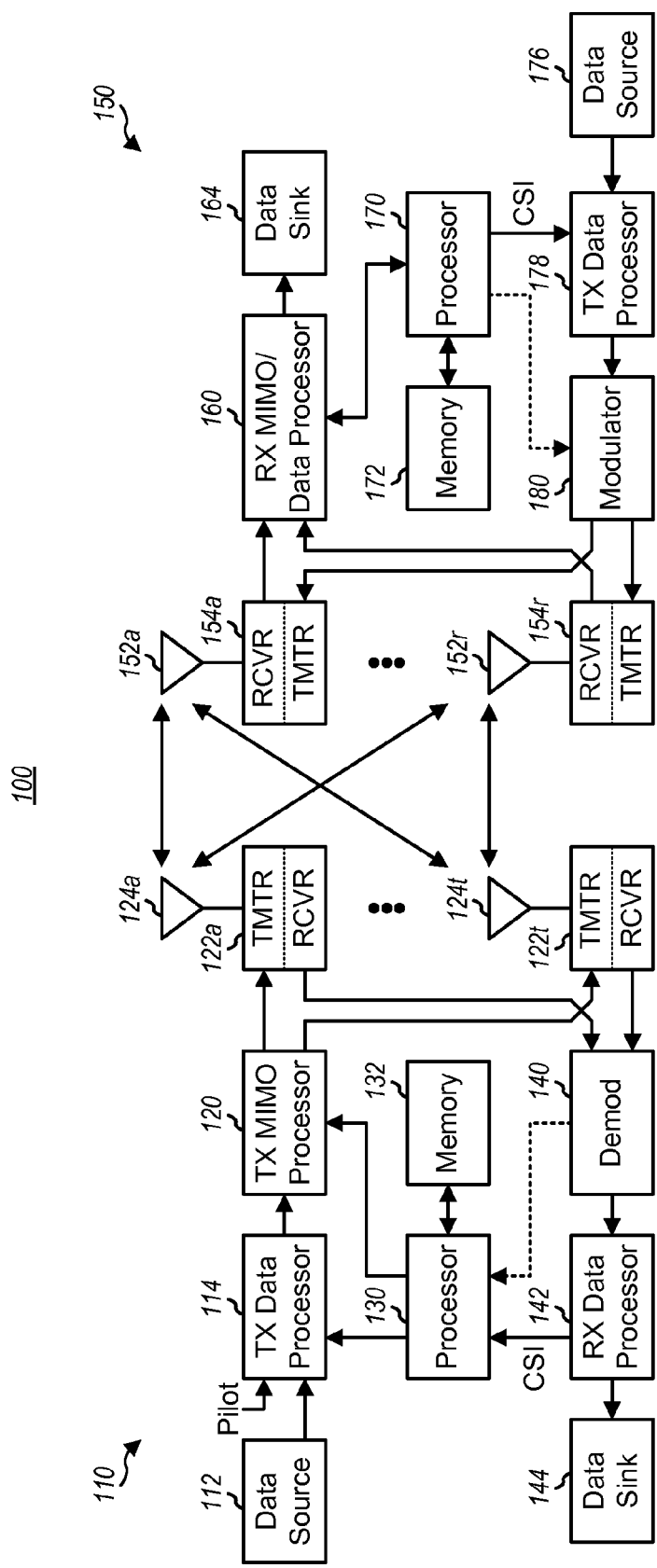
FIG. 1 illustrates a block diagram of an embodiment of a transmitter system and a receiver system in a MIMO system.

FIG. 1 is a block diagram of an embodiment of a transmitter system 110 and a receiver system 150 in a MIMO system 100. At transmitter system 110, traffic data for a number of data streams is provided from a data source 112 to a transmit (TX) data processor 114. In an embodiment, each data stream is transmitted over a respective transmit antenna. TX data processor 114 formats, codes, and interleaves the traffic data for each data stream based on a particular coding scheme selected for that data stream to provide coded data.

The coded data for each data stream may be multiplexed with pilot data using, for example, time division multiplexing (TDM) or code division multiplexing (CDM). The pilot data is typically a known data pattern that is processed in a known manner (if at all), and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by controls provided by a processor 130.

The modulation symbols for all data streams are then provided to a TX MIMO processor 120, which may further process the modulation symbols (e.g., for OFDM). TX MIMO processor 120 then provides $N_T$ modulation symbol streams to $N_T$ transmitters (TMTR) 122a through 122t. Each transmitter 122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 122a through 122t are then transmitted from $N_T$ antennas 124a through 124t, respectively.

At receiver system 150, the transmitted modulated signals are received by $N_R$ antennas 152a through 152r, and the received signal from each antenna 152 is provided to a respective receiver (RCVR) 154. Each receiver 154 conditions (e.g., filters, amplifies, and downconverts) a respective received signal, digitizes the conditioned signal to provide samples, and further processes the samples to provide a corresponding "received" symbol stream.

An RX MIMO/data processor 160 then receives and processes the $N_R$ received symbol streams from $N_R$ receivers 154 based on a particular receiver processing technique to provide $N_T$ "detected" symbol streams. The processing by RX MIMO/data processor 160 is described in further detail below. Each detected symbol stream includes symbols that are estimates of the modulation symbols transmitted for the corresponding data stream. RX MIMO/data processor 160 then demodulates, deinterleaves, and decodes each detected symbol stream to recover the traffic data for the data stream. The processing by RX MIMO/data processor 160 is complementary to that performed by TX MIMO processor 120 and TX data processor 114 at transmitter system 110.

RX MIMO processor 160 may derive an estimate of the channel response between the $N_T$ transmit and $N_R$ receive antennas, e.g., based on the pilot multiplexed with the traffic data. The channel response estimate may be used to perform space or space/time processing at the receiver. RX MIMO processor 160 may further estimate the signal-to-noise-and-interference ratios (SNRs) of the detected symbol streams, and possibly other channel characteristics, and provides these quantities to a processor 170. RX MIMO/data processor 160 or processor 170 may further derive an estimate of the "operating" SNR for the system, which is indicative of the conditions of the communication link. Processor 170 then provides channel state information (CSI), which may comprise various types of information regarding the communication link and/ or the received data stream. For example, the CSI may comprise only the operating SNR. The CSI is then processed by a TX data processor 178, modulated by a modulator 180, conditioned by transmitters 154a through 154r, and transmitted back to transmitter system 110.

At transmitter system 110, the modulated signals from receiver system 150 are received by antennas 124, conditioned by receivers 122, demodulated by a demodulator 140, and processed by a RX data processor 142 to recover the CSI reported by the receiver system. The reported CSI is then provided to processor 130 and used to (1) determine the data rates and coding and modulation schemes to be used for the data streams and (2) generate various controls for TX data processor 114 and TX MIMO processor 120.

Processors 130 and 170 direct the operation at the transmitter and receiver systems that they are coupled with including the appropriate transmit and receive data processors. Memories 132 and 172 provide storage for program codes and data used by processors 130 and 170, respectively.

The model for an OFDM MIMO system may be expressed as:

$$y = Hx + n, \qquad \text{Eq (1)}$$

where y is the received vector, i.e., $y = [y_1\, y_2 \ldots y_{N_R}]^T$, where $\{y_i\}$ is the entry received on the i-th received antenna and $i \in \{1, \ldots, N_R\}$;

x is the transmitted vector, i.e., $x = [x_1\, x_2 \ldots x_{N_T}]^T$, where $\{x_j\}$ is the entry transmitted from the j-th transmit antenna and $j \in \{1, \ldots, N_T\}$;

H is the channel response matrix for the MIMO channel;

n is the additive white Gaussian noise (AWGN) with a mean vector of 0 and a covariance matrix of $\Lambda_n = \sigma^2 I$, where 0 is a vector of zeros, I is the identity matrix with ones along the diagonal and zeros everywhere else, and $\sigma^2$ is the variance of the noise; and $[.]^T$ denotes the transpose of $[.]$.

Due to scattering in the propagation environment, the $N_T$ symbol streams transmitted from the $N_T$ transmit antennas interfere with each other at the receiver. In particular, a given symbol stream transmitted from one transmit antenna may be received by all $N_R$ receive antennas at different amplitudes and phases. Each received signal may then include a component of each of the $N_T$ transmitted symbol streams. The $N_R$ received signals would collectively include all $N_T$ transmitted symbols streams. However, these $N_T$ symbol streams are dispersed among the $N_R$ received signals.

At the receiver, various processing techniques may be used to process the $N_R$ received signals to detect the $N_T$ transmitted symbol streams. These receiver processing techniques may be grouped into two primary categories:

spatial and space-time receiver processing techniques (which are also referred to as equalization techniques), and "successive nulling/equalization and interference cancellation" receiver processing technique (which is also referred to as "successive interference cancellation" or "successive cancellation" receiver processing technique).

Figure 2:
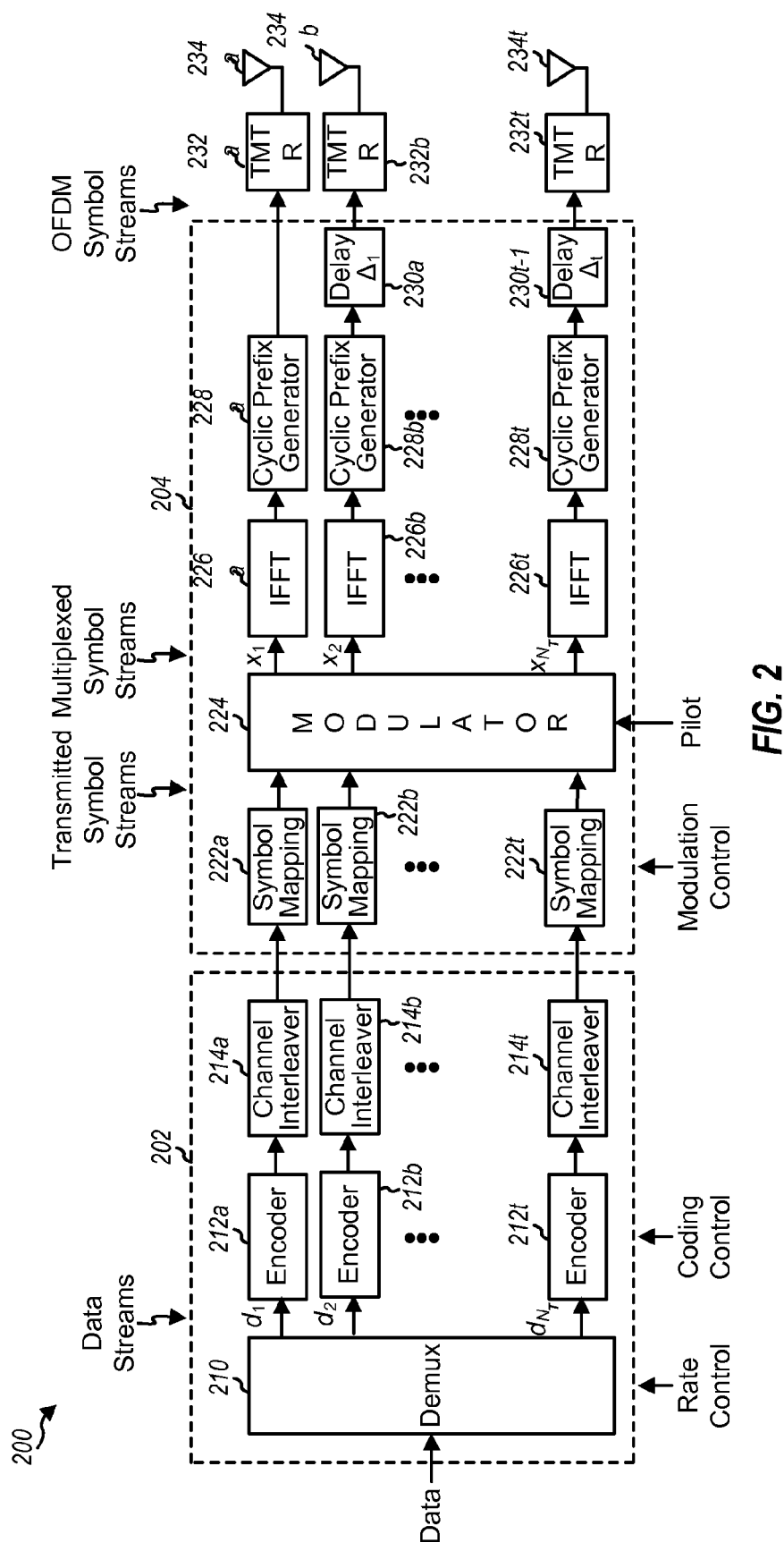
FIG. 2 illustrates a block diagram of an embodiment of a transmitter unit that provides time-varying delay diversity.

FIG. 2 is a block diagram of a portion of a transmitter unit 200, which may be an embodiment of the transmitter portion of a transmitter system, e.g. such as transmitter system 110 in FIG. 1. In one embodiment, a separate data rate and coding and modulation scheme may be used for each of the $N_T$ data streams to be transmitted on the $N_T$ transmit antennas (i.e., separate coding and modulation on a per-antenna basis). The specific data rate and coding and modulation schemes to be used for each transmit antenna may be determined based on controls provided by processor 130, and the data rates may be determined as described above.

Transmitter unit 200 includes, in one embodiment, a transmit data processor 202 that receives, codes, and modulates each data stream in accordance with a separate coding and modulation scheme to provide modulation symbols and transmit MIMO Transmit data processor 202 and transmit data processor 204 are one embodiment of transmit data processor 114 and transmit MIMO processor 120, respectively, of FIG. 1.

In one embodiment, as shown in FIG. 2, transmit data processor 202 includes demultiplexer 210, $N_T$ encoders 212a through 212t, and $N_T$ channel interleavers 214a through 214t (i.e., one set of demultiplexers, encoders, and channel interleavers for each transmit antenna). Demultiplexer 210 demultiplexes data (i.e., the information bits) into $N_T$ data streams for the $N_T$ transmit antennas to be used for data transmission. The $N_T$ data streams may be associated with different data rates, as determined by rate control functionality, which in one embodiment may be provided by processor 130 or 170 (FIG. 1). Each data stream is provided to a respective encoder 212a through 212t.

Each encoder 212a through 212t receives and codes a respective data stream based on the specific coding scheme selected for that data stream to provide coded bits. In one embodiment, the coding may be used to increase the reliability of data transmission. The coding scheme may include in one embodiment any combination of cyclic redundancy check (CRC) coding, convolutional coding, Turbo coding, block coding, or the like. The coded bits from each encoder 212a through 212t are then provided to a respective channel interleaver 214a through 214t, which interleaves the coded bits based on a particular interleaving scheme. The interleaving provides time diversity for the coded bits, permits the data to be transmitted based on an average SNR for the transmission channels used for the data stream, combats fading, and further removes correlation between coded bits used to form each modulation symbol.

The coded and interleaved bits from each channel interleaver 214a through 214t are provided to a respective symbol mapping block 222a through 222t, of transmit MIMO processor 204, which maps these bits to form modulation symbols.

The particular modulation scheme to be implemented by each symbol mapping block 222a through 222t is determined by the modulation control provided by processor 130. Each symbol mapping block 222a through 222t groups sets of $q_j$ coded and interleaved bits to form non-binary symbols, and further maps each non-binary symbol to a specific point in a signal constellation corresponding to the selected modulation scheme (e.g., QPSK, M-PSK, M-QAM, or some other modulation scheme). Each mapped signal point corresponds to an $M_j$-ary modulation symbol, where $M_j$ corresponds to the specific modulation scheme selected for the j-th transmit antenna and $M_j = 2^{q_j}$. Symbol mapping blocks 222a through 222t then provide $N_T$ streams of modulation symbols.

In the specific embodiment illustrated in FIG. 2, transmit MIMO processor 204 also includes a modulator 224 and inverse Fast Fourier transform (IFFT) block 226a through 226t, along with symbol mapping blocks 222a through 222t. Modulator 224 modulates the samples to form the modulation symbols for the $N_T$ streams on the proper subbands and transmit antennas. In addition modulator 224 provides each of the $N_T$ symbol streams at a proscribed power level. In one embodiment, modulator 224 may modulate symbols according to a hopping sequence controlled by a processor, e.g. processor 130 or 170. In such an embodiment, the frequencies with which the $N_T$ symbol streams are modulated may vary for each group or block of symbols, frame, or portion of a frame of a transmission cycle.

Each IFFT block 226a through 226t receives a respective modulation symbol stream from modulator 224. Each IFFT block 226a through 226t groups sets of $N_F$ modulation symbols to form corresponding modulation symbol vectors, and converts each modulation symbol vector into its time-domain representation (which is referred to as an OFDM symbol) using the inverse fast Fourier transform. IFFT blocks 226a through 226t may be designed to perform the inverse transform on any number of frequency subchannels (e.g., 8, 16, 32, ..., $N_F$,).

Each time-domain representation of the modulation symbol vector generated by IFFT blocks 226a through 226t is provided to an associated cyclic prefix generator 228a through 228t. The cyclic prefix generators 228a through 228t pre-pending a prefix of a fixed number of samples, which are generally a number of samples from the end of the OFDM symbol, to the $N_S$ samples that constitute an OFDM symbol to form a corresponding transmission symbol. The prefix is designed to improve performance against deleterious path effects such as channel dispersion caused by frequency selective fading. Cyclic prefix generators 228a through 228t then provide a stream of transmission symbols to an associated delay element 230a through 230t-1.

Each delay element 230a through 230t-1 provides a delay to each symbol that is output from cyclic prefix generators 228a through 228t. In one embodiment, the delay provided by each delay element 230a through 230t-1 varies in time. In one embodiment, this delay is such that the delay varies between consecutive symbols output by the cyclic prefix generator or consecutive symbols that are to be consecutively transmitted from the transmitter unit 200. In other embodiments, the delay may vary between groups of two, three, four, or more symbols with each symbol within the group having a same delay. In additional embodiments, all of the symbols in a frame or burst period would have a same delay with each frame or burst period having a different delay for each symbol than a preceding or following frame or burst period.

Also, in the embodiment depicted in FIG. 2, the delay provided by each delay element 230a through 230t-1 is different than the delay provided by each other delay element. Further, while FIG. 2 depicts that cyclic prefix generator 228a is not coupled to a delay element, other embodiments may provide a delay element to the output of each of the cyclic prefix generators 228a through 228t.

The symbols output by delay elements 230a through 230t-1 are provided to an associated transmitter 232a through 232t which causes the symbols to be transmitted by antennas 232a through 232t according to the delay provided by delay elements 230a through 230t-1.

As stated above, in one embodiment, the time varying delay $\Delta_m$ provided by each delay element 230a through 230t- varies with time. In one embodiment, the i-th OFDM symbol is transmitted as a transmitted symbol from antenna m according a delay of Eq. 2:

$$s((k - \Delta_m) \bmod N) = \frac{1}{\sqrt{N}} \sum_{n=0}^{N-1} X_n e^{-j(2\pi/N)n\Delta_m(i)} \cdot e^{-j(2\pi/N)nk} \quad \text{(Eq. 2)}$$

The resulting overall channel in this case may be described as $$H(i, n) = \sum_{m=1}^{M} H_m(i, n) \cdot e^{-j(2\pi/N)n\Delta_m(i)} \quad \text{(Eq. 3)}$$

where $H_m(i,n)$ is the channel n-th discrete Fourier Transform (DFT) coefficient for the channel impulse response from the m-th transmitting antenna to the receiving antenna.

The use of this time varying delay can introduce both frequency selectivity and time selectivity into the channel that may be utilized to improve performance. For example, by using time varying delay for transmission symbols across different sub-carriers and different OFDM symbols, both the time selectivity and frequency selectivity can simultaneously be provided. Moreover, in the case of transmission to multiple users, the time variation of the channel that is provided by varying the delay for symbols can be exploited to provide diversity gains to each of the multiple users, since each user's receiver will have different channel conditions than each other user's receiver.

In one embodiment, the delay $\Delta_m(i)$ may be changed in a linear fashion with time with each consecutive, or group of consecutive symbols, being delayed by n*β samples, where β is a constant and n varying from 0, 1, ..., N−1, where N is the number of symbols in a frame, burst period, or symbol stream. In another embodiment, the delay $\Delta_m(i)$ may be a random delay, based upon a pseudo random sequence, with respect to an adjacent channel, i.e. antenna, of the $N_T$ antennas, a preceding and/or following symbol. In an additional embodiment, the delay may be varied by f(x) where f is a function such as a sine, cosine, or other time varying function, and x varies from 0, 1, ..., N−1 or some multiples thereof, where N is the number of symbols in a frame, burst period, or symbol stream. In each of the previous embodiments, the delay may also be changed based on feedback information, in which case the receiver sends back a channel quality indicator that describes the overall channel conditions and $\Delta_m(i)$ is changed to improve the overall quality.

Figure 3:
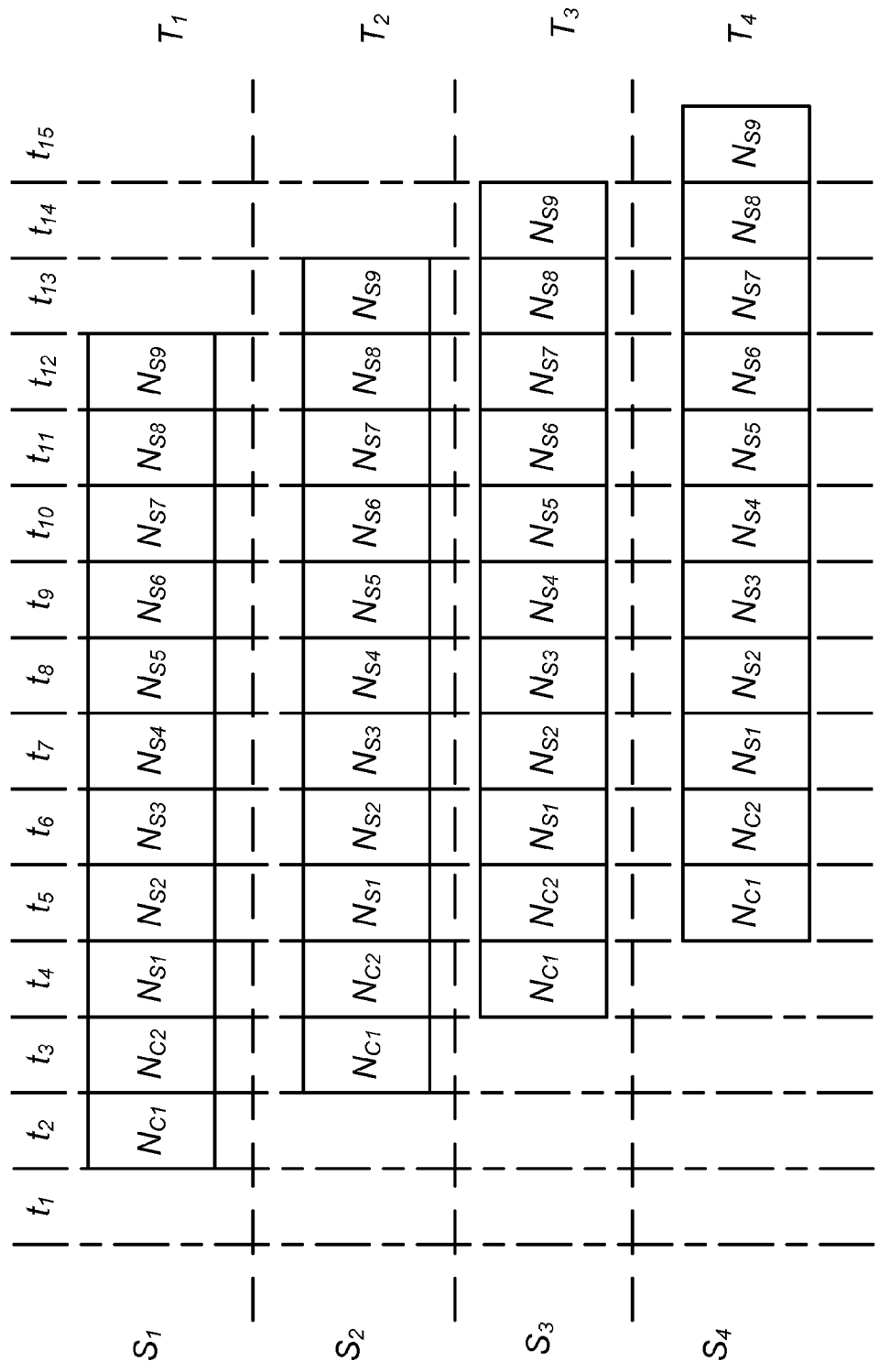
FIG. 3 illustrates an embodiment of a time varying delay applied to symbols transmitted from a same antenna.

Referring to FIG. 3, an embodiment of a time varying delay applied to symbols transmitted from a same antenna is illustrated. Symbols $S_1$, $S_2$, $S_3$, and $S_4$ are generated to be transmitted during consecutive time slots $T_1$, $T_2$, $T_3$, and $T_4$ respectively. Each symbol $S_1$, $S_2$, $S_3$, and $S_4$ comprises nine samples $N_{S1}$, $N_{S2}$, $N_{S3}$, $N_{S4}$, $N_{S5}$, $N_{S6}$, $N_{S7}$, $N_{S8}$, $N_{S9}$, and a two-sample cyclic prefix $N_{C1}$ and $N_{C2}$, which are samples $N_{S8}$, and $N_{S9}$ respectively. It should be noted that the content of each sample may be different for each of the symbols. It should be noted that the samples $N_{S1}$, $N_{S2}$, $N_{S3}$, $N_{S4}$, $N_{S5}$, $N_{S6}$, $N_{S7}$, $N_{S8}$, $N_{S9}$ are to be combined to form symbol $S_1$ in the order of $N_{S1}$, $N_{S2}$, $N_{S3}$, $N_{S4}$, $N_{S5}$, $N_{S6}$, $N_{S7}$, $N_{S8}$, $N_{S9}$.

The delay element, e.g. delay element 230a, then provides a delay to the symbol $S_1$, $S_2$, $S_3$, and $S_4$ that are transmitted from the same antenna. In the embodiment depicted in FIG. 3, the delay for symbol $S_1$ is one sample period $t_1$. The next symbol $S_2$, which is to be transmitted on the same antenna immediately after symbol $S_1$, is delayed by two sample periods $t_1$ and $t_2$. The next symbol $S_3$, which is to be transmitted on the same antenna immediately after symbol $S_2$, is delayed by three sample periods $t_1$, $t_2$, and $t_3$. The next symbol $S_4$, which is to be transmitted on the same antenna immediately after symbol $S_3$, is delayed by four sample periods $t_1$, $t_2$, $t_3$, and $t_4$. If additional symbols are to be transmitted on the same antenna, the next consecutive symbol would be transmitted with a delay of five sample periods $t_1$, $t_2$, $t_3$, $t_4$, and $t_5$. In this way, a linear time varying delay may be applied to transmission from an antenna, which may or may not be part of a MIMO system.

It should be noted the linear variation of the delay period need not be sequential by one sample period, but may be sequential by 2 or more sample periods as well, e.g. the first symbol $S_1$ may be delayed by three sample periods, the second symbol $S_2$ is delayed by six sample periods, the third symbol $S_3$ is delayed by nine sample periods, and the fourth symbol $S_4$ is delayed by twelve sample periods. Also, the linear variation need not vary between each consecutive symbol but for groups of symbols, e.g. symbols $S_1$ and $S_2$ are each delayed by one sample period and symbols $S_3$, and $S_4$ are each delayed by two or more sample periods.

Figure 4:
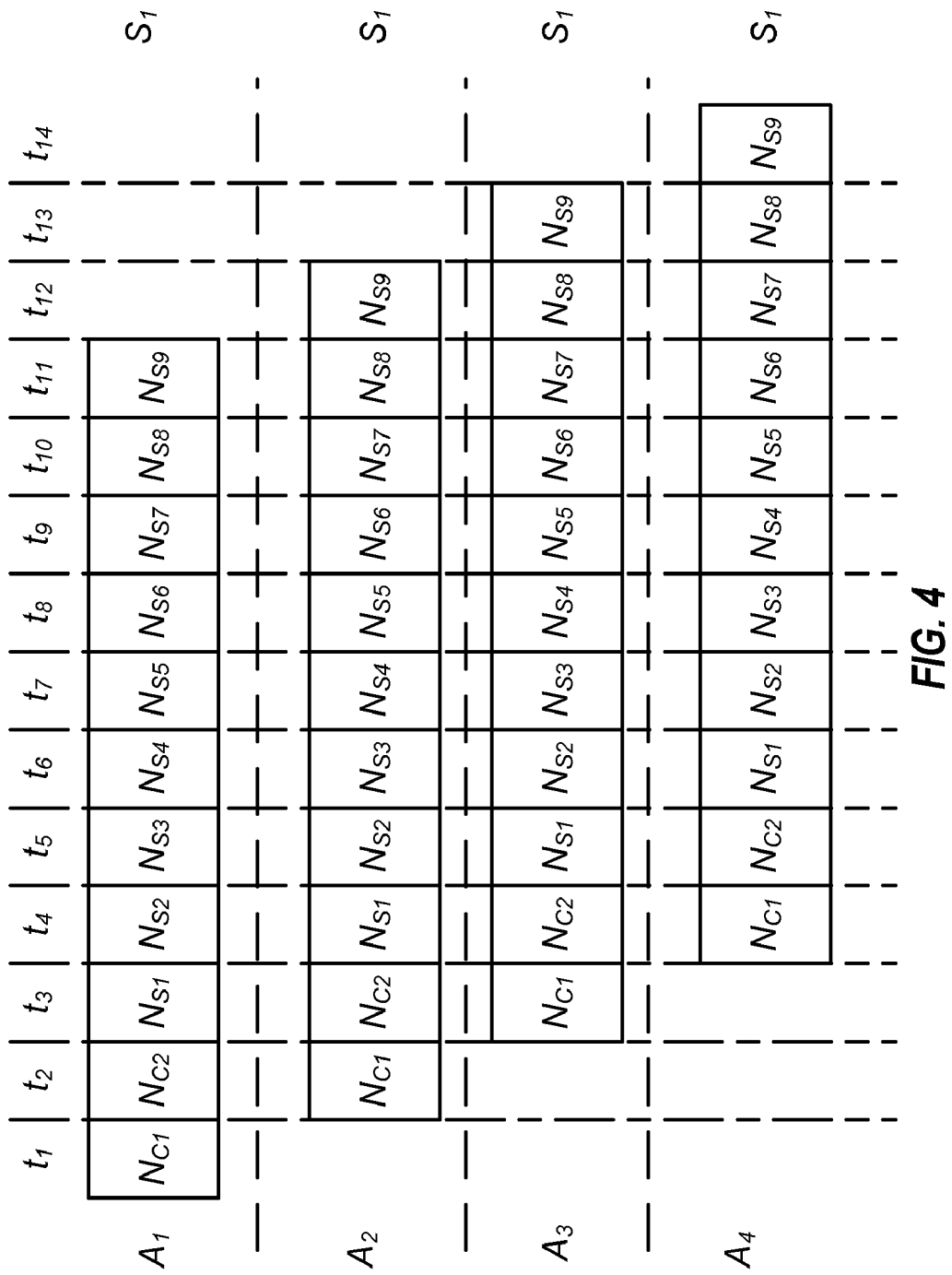
FIG. 4 illustrates an embodiment of a time varying delay applied to a symbol transmitted on multiple antennas.

Referring to FIG. 4, an embodiment of a time varying delay applied to a symbol transmitted on multiple antennas is illustrated. A same symbol $S_1$ is to be transmitted from antennas $A_1, A_2, A_3$, and $A_4$. Symbol $S_1$ comprises nine samples $N_{S1}$, $N_{S2}, N_{S3}, N_{S4}, N_{S5}, N_{S6}, N_{S7}, N_{S8}, N_{S9}$, and a two-sample cyclic prefix $N_{C1}$ and $N_{C2}$, which are samples $N_{S_8}$ and $N_{S9}$ respectively. From first antenna $A_1$ symbol $S_1$ is not delayed by any sample periods. From second antenna $A_2$, symbol $S_1$ is delayed by one sample period $t_1$. From third antenna $A_3$, symbol $S_1$ is delayed by two sample periods $t_1$ and $t_2$. From fourth antenna $A_4$, symbol $S_1$ is delayed by three sample periods $t_1, t_2$, and $t_3$. As such, time and frequency diversity may be provided in a MIMO system in addition to the spatial diversity provided by antennas $A_1, A_2, A_3$, and $A_4$.

The time diversity provided for the scheme depicted in FIG. 4, and variations thereof, provides a reduction in the likelihood of collisions by the same samples of a same symbol thereby minimizing the possibility of destructive or constructive addition of the channels.

It should be noted that the delay variation between a same symbol transmitted on a same antenna need not be linear or even related to the delay on the other antennas, so long as if the symbol is to be transmitted substantially simultaneously, it should be delayed by a different amount on each antenna.

It should be noted that, the order utilized need not correspond to the number of antennas and may vary for smaller groups or in a larger number than the number of antennas.

In addition, as discussed with respect to FIG. 2, the delay may be random and may be based on a function such as a sine, cosine, or other function. In some embodiments, the delay period is limited to a number of samples in a symbol, where the delay period may be repeated after a fixed or random number of symbols. Also, it should be noted that the delay between symbols can be fractions of sample periods and is not limited to being multiples of entire sample periods. The fractional delay may be implemented, in one embodiment, by using fractions of clock periods of the one or more clocks of transmitter unit 200.

Figure 5:
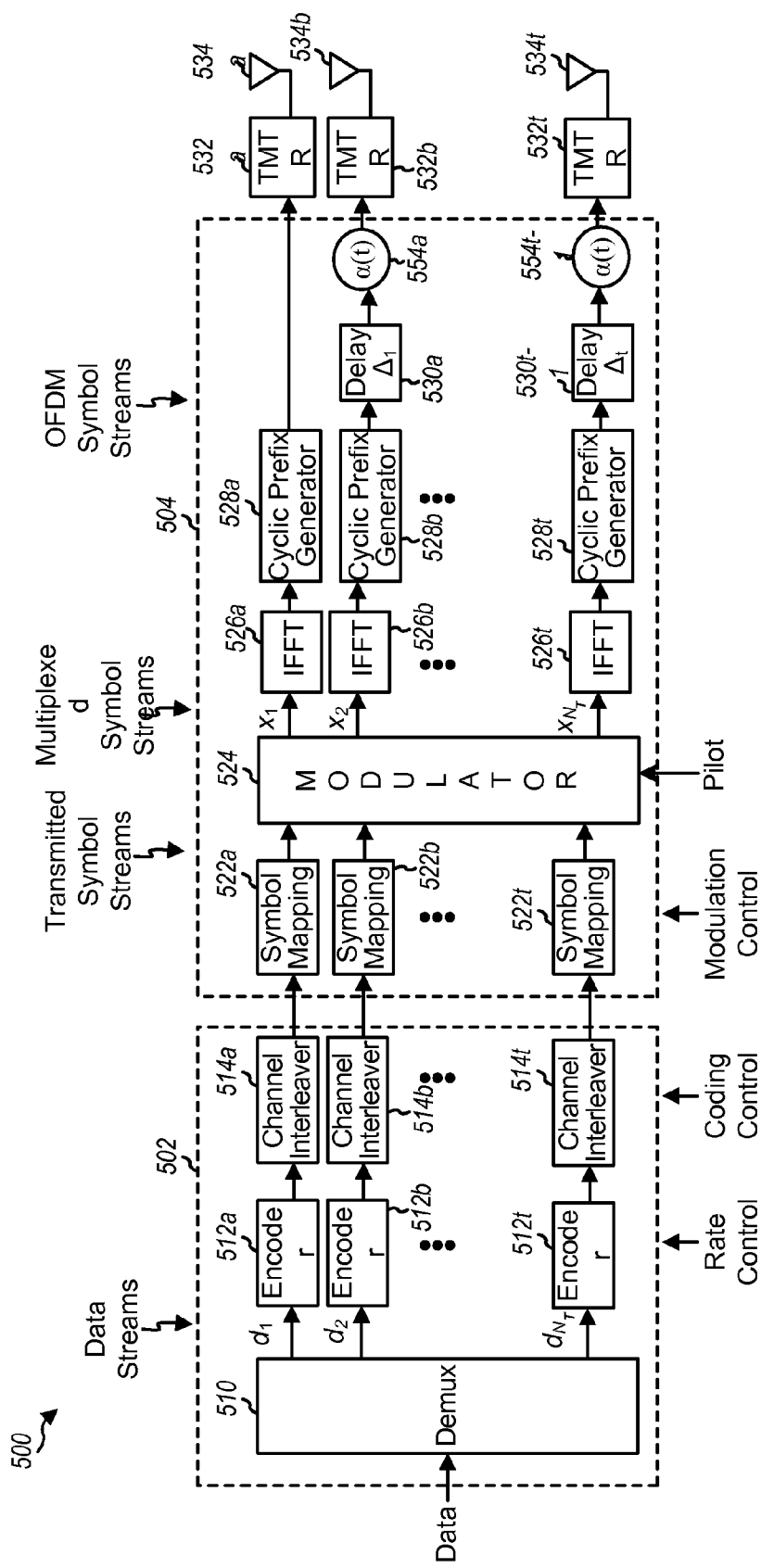
FIG. 5 illustrates a block diagram of another embodiment of a transmitter unit that provides time-varying delay diversity.

Referring to FIG. 5, a block diagram of another embodiment of a transmitter unit that provides time-varying delay diversity is illustrated. Transmitter unit 500 is substantially identical to transmitter unit 200. In addition, scaling circuits 554a through 554t-1 are each coupled to an output of one of the delay elements 530a through 530t-1. Scaling circuits 534a through 534t-1 provide a fixed scalar shift to the delay provided by each of the delay elements 530a through 530t-1. For example, a fixed shift is applied to each delay so that, for example if a constant shift of 0.5 is applied then a one sample period delay would be 0.5 samples periods, a two-sample period delay would be one sample period, and a five sample period delay would be two and a half sample periods. In one embodiment, each of scaling circuits 554a through 554t-1 provides a shift that is different than each other scaling circuit. In one embodiment, a linear progression is provided across scaling circuits 554a through 534t-1 that is scaling circuit 554a provides a shift less than, 554b, which is less than 554c, etc.

It should be noted that while FIG. 5, depicts that cyclic prefix generator 228a is not coupled to a delay element, other embodiments may provide a delay element to the output of each of the cyclic prefix generators 228a through 228t. Also, while FIG. 5, depicts that cyclic prefix generator 228a is not coupled to a scaling circuit, other embodiments may provide a scaling circuit to the output of each of the cyclic prefix generators 228a through 228t, regardless of whether a delay circuit is coupled to the cyclic prefix generator.

Figure 6:
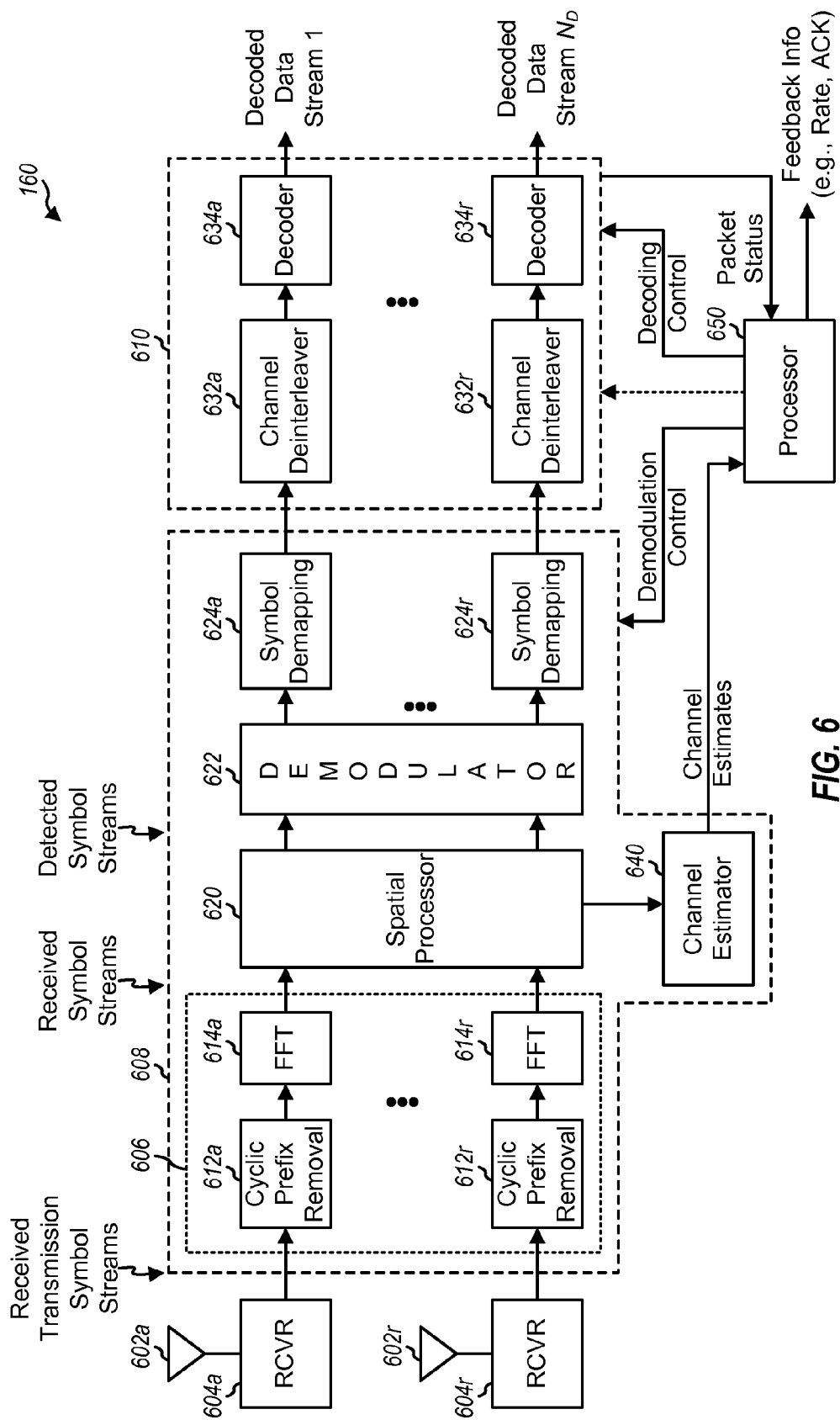
FIG. 6 illustrates a block diagram of an embodiment of a receiver unit capable of utilizing time-varying delay diversity.

Referring to FIG. 6, a block diagram of an embodiment of a receiver unit capable of utilizing time-varying delay diversity is illustrated. The transmitted signals are received by antennas 602a through 602r and processed by receivers 604a through 604r, respectively, to provide $N_R$ sample streams, which are then provided to an RX processor 606.

Within demodulator 608, cyclic prefix removal element 612a through 612r and FFT blocks 614a through 614r provide $N_R$ symbol streams. Cyclic prefix removal elements 612a through 612r remove the cyclic prefix included in each transmission symbol to provide a corresponding recovered OFDM symbol.

FFT blocks 614a through 614r then transform each recovered symbol of the symbol stream using the fast Fourier transform to provide a vector of $N_F$ recovered modulation symbols for the $N_F$ frequency subchannels for each transmission symbol period. FFT blocks 614a through 614r provide $N_R$ received symbol streams to a spatial processor 620.

Spatial processor 620 performs spatial or space-time processing on the $N_R$ received symbol streams to provide $N_T$ detected symbol streams, which are estimates of the $N_T$ transmitted symbol streams. Spatial processor 620 may implement a linear ZF equalizer, a channel correlation matrix inversion (CCMI) equalizer, a minimum mean square error (MMSE) equalizer, an MMSE linear equalizer (MMSE-LE), a decision feedback equalizer (DFE), or some other equalizer, which are described and depicted in U.S. patent application Ser. Nos. 09/993,087, 09/854,235, 09/826,481, and 09/956,444 each of which is incorporated herein by reference in their entireties.

Spatial processor 620 may be capable of compensating for the time varying delay provided by the delay elements and/or scaling circuit of the transmitters, which are discussed with respect to FIGS. 2 and 5. This compensation may be provided, in one embodiment, by having the delay scheme, e.g. linear, random according to a pseudo random sequence, or function, known a priori by the receiver unit 600. This knowledge may be provide, for example, by having a same scheme utilized by all transmitters or providing information as to the scheme utilized as part of the initialization of communication between the transmitter and receiver unit 600.

A multiplexer/demultiplexer 622 then multiplexes/demultiplexes the detected symbols, and provides $N_D$ aggregated detected symbol streams for the $N_D$ data streams to $N_D$ symbol demapping elements 624a through 624r. Each symbol demapping element 624a through 624r then demodulates the detected symbols in accordance with a demodulation scheme that is complementary to the modulation scheme used for the data stream. The $N_D$ demodulated data streams from $N_D$ symbol demapping elements 624a through 624r are then provided to a RX data processor 610.

Within RX data processor 610, each demodulated data stream is de-interleaved by a channel de-interleaver 632a through 632r in a manner complementary to that performed at the transmitter system for the data stream, and the de-interleaved data is further decoded by a decoder 634a through 634r in a manner complementary to that performed at the transmitter system. For example, a Turbo decoder or a Viterbi decoder may be used for decoder 634a through 634r if Turbo or convolutional coding, respectively, is performed at the transmitter unit. The decoded data stream from each decoder 634a through 634r represents an estimate of the transmitted data stream. Decoders 634a through 634r may also provide the status of each received packet (e.g., indicating whether it was received correctly or in error). Decoder 634a through 634r may further store demodulated data for packets not decoded correctly, so that this data may be combined with data from a subsequent incremental transmission and decoded.

In the embodiment shown in FIG. 6, a channel estimator 640 estimates the channel response and the noise variance and provides these estimates to processor 650. The channel response and noise variance may be estimated based on the detected symbols for the pilot.

Processor 650 may be designed to perform various functions related to rate selection. For example, processor 650 may determine the maximum data rate that may be used for each data stream based on the channel estimates and other parameters such as the modulation scheme.

Figure 7:
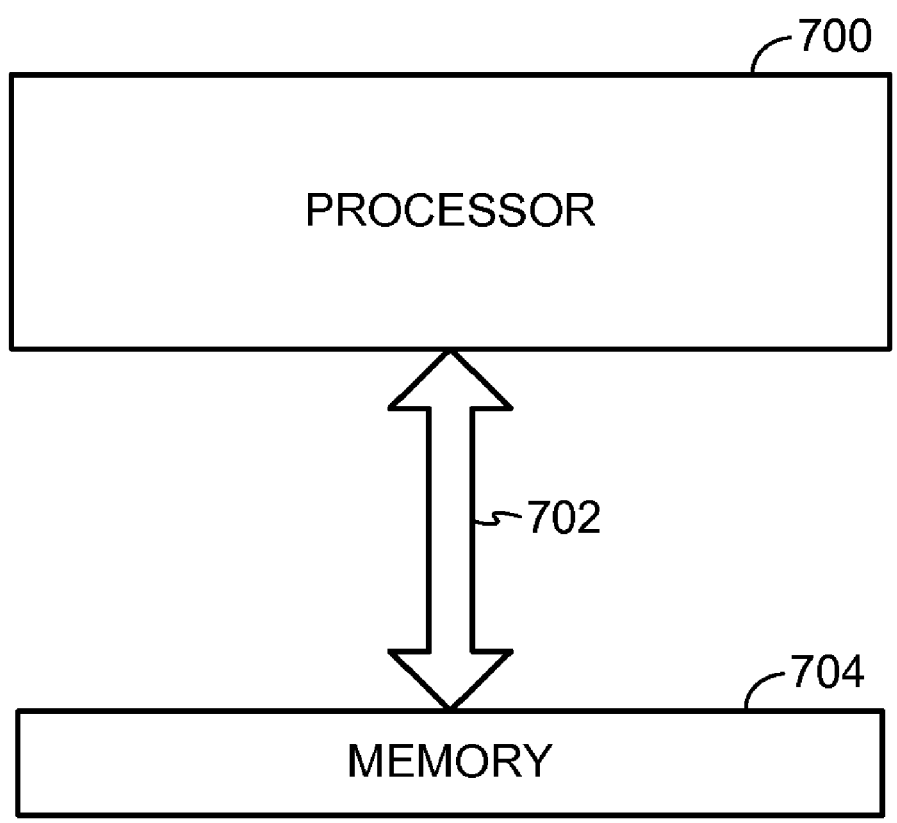
FIG. 7 illustrates a block diagram of an embodiment of a delay element.

Referring to FIG. 7, a block diagram of an embodiment of a delay element is illustrated. A processor 700 is coupled via a bus 702 with a memory 704. Memory 704 is utilized to store samples of time-domain representations of the modulation symbols that are provided for transmission. The samples of each symbol are stored in memory locations that are known to processor 700. Processor 700 can then instruct memory 704 to output the samples of each symbol utilizing any desired time varying delay for consecutive, groups, or frames or burst periods of symbols.

As described with respect to FIGS. 3 and 4, the delay for each symbol may vary between each symbol, for groups of symbols that are to be transmitted contiguously, and between symbols in different frames or bursts periods. The use of a memory allows for any predetermined or adaptive scheme to be utilized for delaying provision of the symbols and therefore providing time diversity that may be varied based upon channel conditions as well as pre-determined schemes, e.g. a linear variation.

Figure 8:
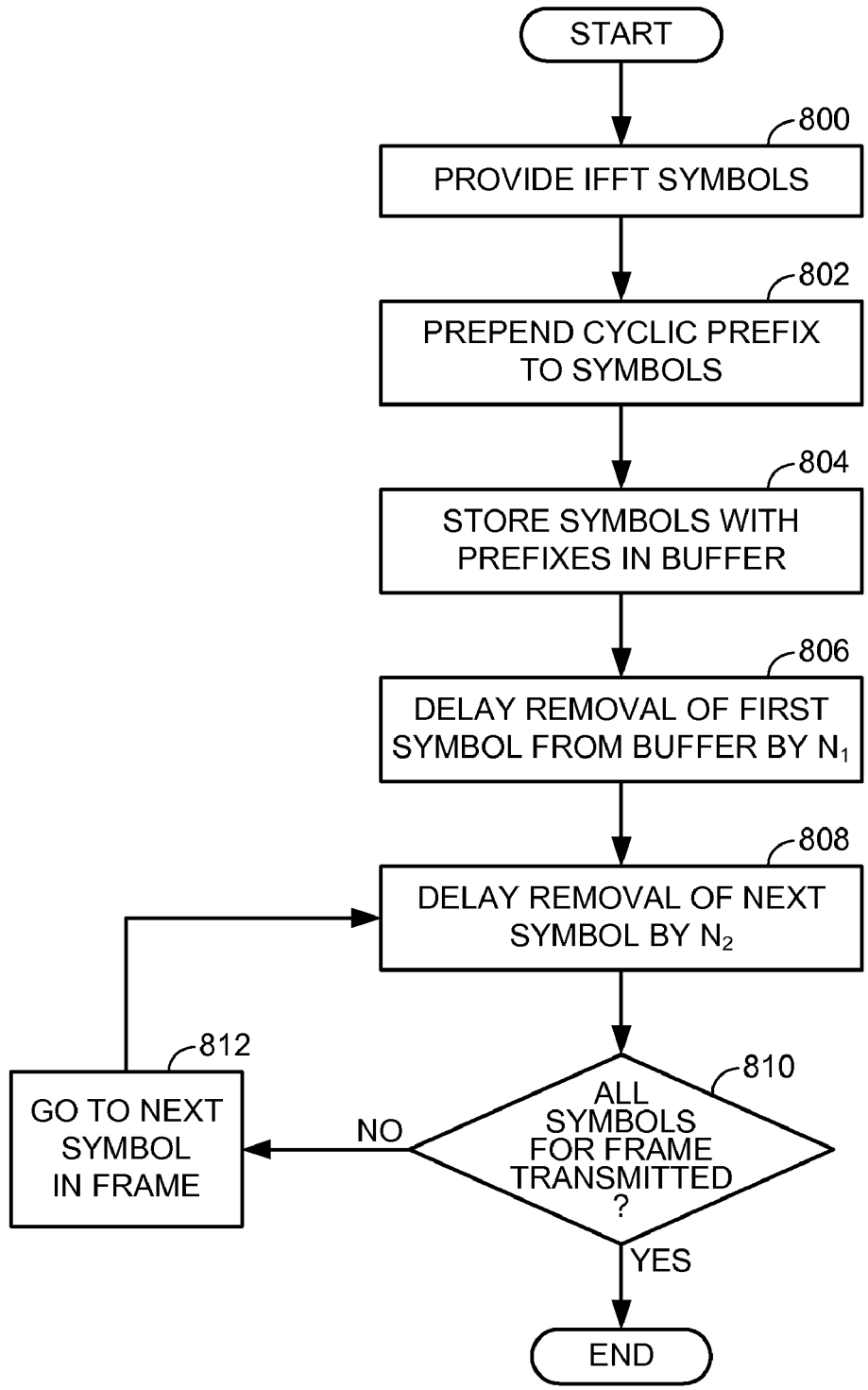
FIG. 8 illustrates a flow chart of an embodiment of a method for providing time-varying diversity.

Referring to FIG. 8, a flow chart of an embodiment of a method for providing time-varying delay diversity is illustrated. Samples of that represent one or more modulated symbols after being subject to an inverse Fast Fourier transform are provided, block 800. A cyclic prefix is then pre-pended to each of the modulated symbols, block 802. The size of the prefix may vary as desired, and in one embodiment may be thirty-two or more samples.

The samples including the cyclic prefix are then stored in a memory, block 804, which in one embodiment may be a buffer. In one embodiment, the samples for each modulated symbol are stored in memory according to the order in which they are provided after pre-pending of the cyclic prefix. In other embodiments, the samples of each modulated symbol may be stored in any order that is desired. A first symbol to be transmitted for a symbol is removed according to a first delay N, block 806. The next symbol to be transmitted is then removed according a second delay, which is different than the first delay, block 808. The second delay, and additional delays for later symbols, may be delays of N+β, where β may be a linear increase or decrease from N, a random change from N, or be the result of some function.

A determination is then made as to whether of the symbols that need to be delayed have been transmitted or otherwise utilized, block 810. If not, additional delays are provided to the output of further symbols from the memory or buffer according to the same time variance, block 808. If yes, then the process ceases, and additional symbols are provided as discussed with respect blocks 800-804, block 812.

Figure 9:
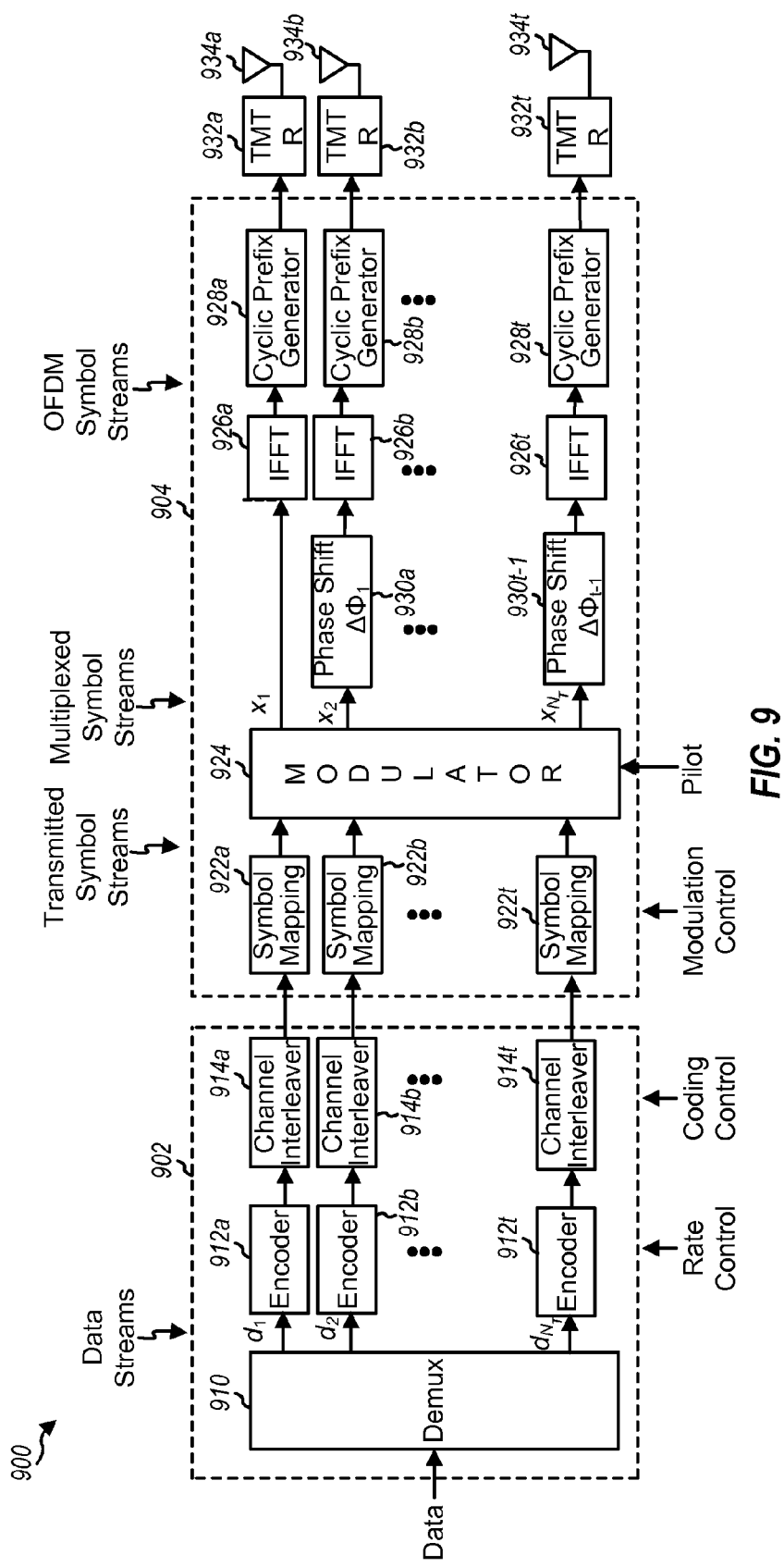
FIG. 9 illustrates a block diagram of a further embodiment of a transmitter unit that provides time-varying delay diversity.

Referring to FIG. 9, a block diagram of a further embodiment of a transmitter unit that provides time-varying delay diversity is illustrated. Transmitter unit 900 is substantially identical to transmitter unit 200. However, instead of utilizing delay element 230a through 230t-1 coupled to an output of IFFT blocks 226a through 226t, phase shift circuits 930a through 930t-1 are coupled before an input of IFFT blocks 926a through 926t, in they receive the output of modulator 924. Phase shift circuits 930a through 930t-provide a time-varying phase shift to the samples of each symbol. For example, phase shift circuit 930a may provide a phase shift $\phi_1$ to the samples of a first symbol and a phase shift $\phi_1$ to the samples of a next or later symbol output by the modulator. The samples of a later symbol may have a phase shift of a different or same amount. This phase shift, may operate as a delay in the time domain, after application of the IFFT by IFFT blocks 926a through 926t.

Each phase shift circuit 930a through 930t may provide a different phase shift than each other phase shift circuit 930a through 930t, so that a delay of a same symbol transmitted from multiple antennas is different from each antenna. The variance may or may not be a function of the phase shift applied with respect to any other antenna.

In one embodiment, the phase shift provided by each phase shift circuit 930a through 930t is such that the phase shift varies between consecutive symbols output by the modulator. In other embodiments, the phase shift may vary between groups of two, three, four, or more symbols with each symbol within the group having a same phase shift. In additional embodiments, all of the symbols in a frame or burst period would have a same phase shift with each frame or burst period having a different phase shift for each symbol than a preceding or following frame or burst period.

It should be noted that while FIG. 9, depicts that a phase shift circuit is not coupled to cyclic prefix generator 928a, other embodiments may provide a phase shift circuit to the output of each of the cyclic prefix generators 928a through 928t.

In some embodiment, the modulator and the phase shift circuit may comprise a processor.

Figure 10:
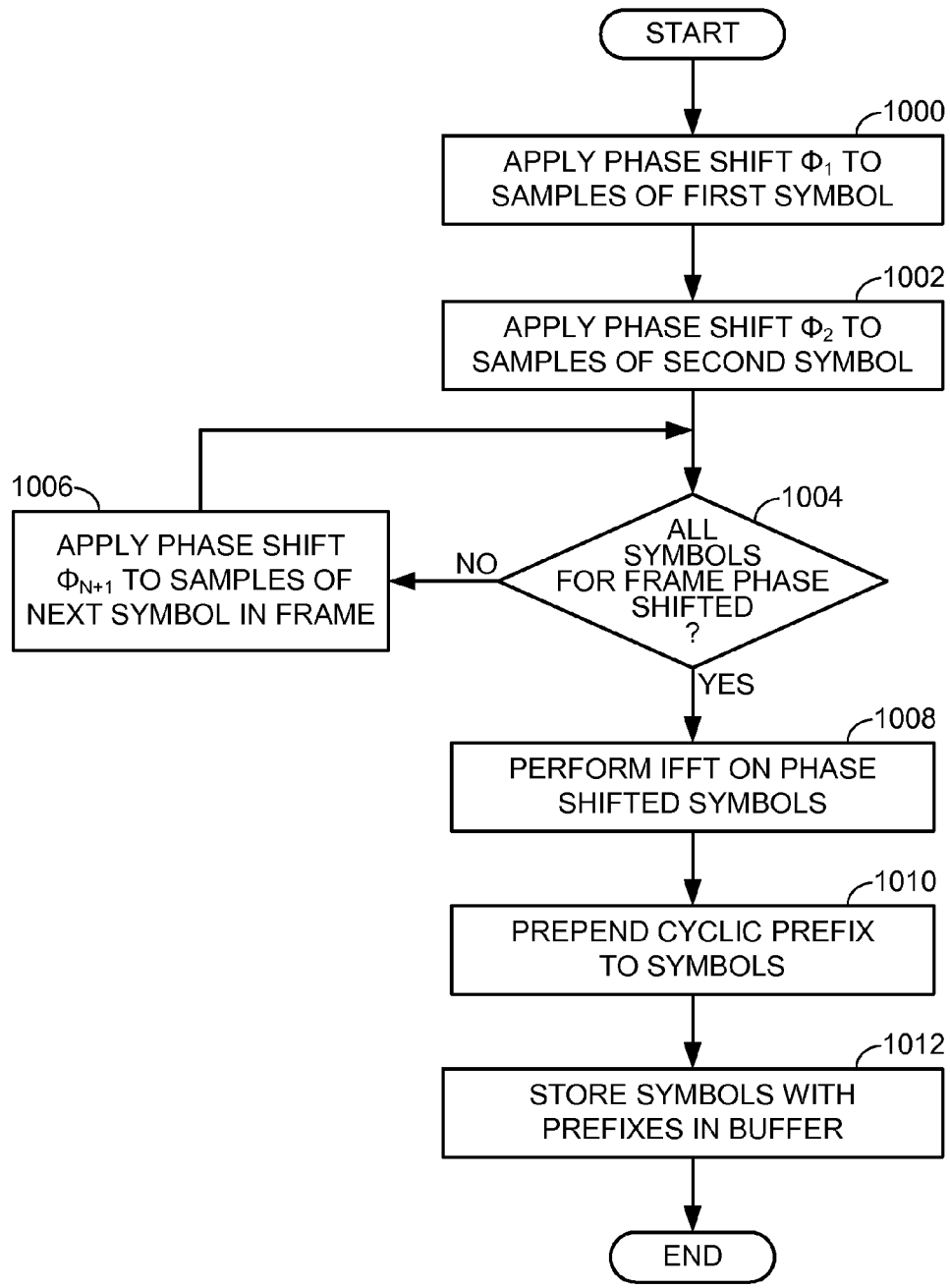
FIG. 10 illustrates a flow chart of a further embodiment of a method for providing time-varying diversity.

Referring to FIG. 10, a flow chart of an embodiment of a method for providing time-varying delay diversity is illustrated. Samples of a first symbol output by a modulator is subject to a first phase shift $\phi_1$, block 1000. The samples of a second symbol are then subject to a phase shift $\phi_2$, which is different than $\phi_1$, block 1002. A determination is then made whether additional symbols have yet to be phase shifted, block 1004. If not, then a phase shift which may be the same or different as $\phi_1$ or $\phi_2$ is then applied to the samples of a next symbol output by the modulator, block 106. This process is then repeated, until there are no additional symbols to phase shift.

If there are no additional symbols to phase shift, the symbols are subject to IFFT, block 1008, the pre-pending of a cyclic prefix, block 1010, and stores the symbol in memory, block 1012, which in one embodiment may be a buffer. In one embodiment, the samples for each modulated symbol are stored in memory according to the order in which they are provided after pre-pending of the cyclic prefix. In other embodiments, the samples of each modulated symbol may be stored in any order that is desired.

In some embodiments, the phase shift may be different between consecutive symbols, groups of symbols, or frames by a phase that is equal to a constant angle multiplied by a varying number corresponding to the location of the symbol in a symbol stream or other ordinal number. The constant angle may be fixed or may vary according to other time constants. Also, the constant angle applied to symbols intended for different antennas may be different.

In other embodiments, the phase shift may vary according to a random phase with respect to any other symbols. This may be provided by utilizing a pseudo random code to generate the phase shift.

It should be noted that while FIG. 10 illustrates waiting to perform IFFT and cyclic prefix pre-pending until a phase shift is applied to all of the symbols of a frame or burst period, each symbol may be subject to IFFT and cyclic prefix pre-pending either individually or in groups before completion of phase shifts to each of the symbols of a frame or burst period.

It should be noted that transmitter 200 and 500 may receive and process a respective modulation symbol stream (for MIMO without OFDM) or transmission symbol stream (for MIMO with OFDM) to generate a modulated signal, which is then transmitted from the associated antenna. Other designs for the transmitter unit may also be implemented and are within the scope of the invention.

The coding and modulation for MIMO systems with and without OFDM are described in further detail in the following U.S. patent applications:

- U.S. patent application Ser. No. 09/993,087, entitled "Multiple-Access Multiple-Input Multiple-Output (MIMO) Communication System," filed Nov. 6, 2001;
- U.S. patent application Ser. No. 09/854,235, entitled "Method and Apparatus for Processing Data in a Multiple-Input Multiple-Output (MIMO) Communication System Utilizing Channel State Information," filed May 11, 2001;
- U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001;
- U.S. patent application Ser. No. 09/776,075, entitled "Coding Scheme for a Wireless Communication System," filed Feb. 1, 2001; and
- U.S. patent application Ser. No. 09/532,492, entitled "High Efficiency, High Performance Communications System Employing Multi-Carrier Modulation," filed Mar. 30, 2000.

These applications are all assigned to the assignee of the present application and incorporated herein by reference. Application Ser. No. 09/776,075 describes a coding scheme whereby different rates may be achieved by coding the data with the same base code (e.g., a convolutional or Turbo code) and adjusting the puncturing to achieve the desired rate. Other coding and modulation schemes may also be used, and this is within the scope of the invention.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, processors, modules, and circuits described in connection with the embodiments disclosed herein may be implemented or performed with a general purpose processor, a digital signal processor (DSP), circuits, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, processor, microprocessor, or state machine. A processor may also be implemented as a combination of devices, e.g., a combination of a DSP and a microprocessor, a plurality of microprocessors, one or more microprocessors in conjunction with a DSP core, multiple logic elements, multiple circuits, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless transmitter, comprising:
   at least three antennas; and
   a memory coupled with the at least three antennas, the memory storing a plurality of symbols each comprising a plurality of samples,
   wherein the plurality of samples of a first symbol of the plurality of symbols are provided to one antenna of the at least three antennas after a first delay period, and the plurality of samples of a second symbol of the plurality of symbols are provided to the one antenna after a second delay period, wherein the first delay period and the second delay period are different, each of the symbols comprising a cyclic prefix of one or more samples, wherein the delay periods that vary according to a defined time varying function are limited based on a number of symbols in a frame, burst period or symbol stream; and
   wherein the plurality of samples of the first symbol are provided to another of the at least three antennas after a third delay period and the plurality of samples of the second symbol are provided to the another antenna after a fourth delay period, wherein the first delay period, second delay period, third delay period, and fourth delay period are all different from each other, wherein the second delay period varies by $n*\beta$ samples from the first delay period and the fourth delay period varies by $n*(\beta+k)$ samples from the third delay period, where n is a location of a symbol in a symbol stream and $\beta$ and k are constants, and wherein time diversity is provided even if a channel is not of itself time selective.

2. The wireless transmitter of claim 1, wherein the memory comprises a buffer.

3. The wireless transmitter of claim 1, further comprising a cyclic prefix generator coupled with the memory that adds the cyclic prefix to each of the plurality of symbols prior to storing the plurality of symbols in memory.

4. The wireless transmitter of claim 1, wherein the delay periods vary according to the defined time varying function that is adjusted based on channel quality indicator feedback that describes channel conditions.

5. The wireless transmitter of claim 1, wherein the delay periods vary according to the defined time varying function that is not adjusted based on channel quality indicator feedback that describes channel conditions.

6. A method for providing transmission diversity in a multi-channel communication system, comprising:
providing, to a first antenna, a first symbol comprising a first plurality of samples;
providing, to a second antenna, the first symbol after a first delay period;
providing, to the first antenna, a second symbol comprising a second plurality of samples;
providing, to the second antenna, the second symbol after a second delay period that is different than the first delay period;
providing, to the first antenna, a third symbol comprising a third plurality of samples;
providing, to the second antenna, the third symbol after a third delay period that is different than the first delay period and the second delay period, each of the symbols comprising a cyclic prefix of one or more samples, wherein the delay periods that vary according to a defined time varying function are limited based on a number of symbols in a frame, burst period or symbol stream, wherein the defined time varying function is $\sin(x)$ where x varies from 0 to N−1 where N is the number of symbols in a frame, burst period or symbol stream, and wherein time diversity is provided even if a channel is not of itself time selective;
modulating the first symbol, second symbol, and third symbol according to different carrier frequencies; and
providing a scalar shift to the first delay period, second delay period, and third delay period.

7. The method of claim 6, wherein the symbols that are delayed according to the defined time varying function and the undelayed symbols are received from a single modulator.

8. The method of claim 7, wherein the ith symbol is transmitted from antenna m according to $$s((k - \Delta_m) \bmod N) = \frac{1}{\sqrt{N}} \sum_{n=0}^{N-1} X_n e^{-j(2\pi/N)n\Delta_m(i)} \cdot e^{-j(2\pi/N)nk}$$

where s( ) is a shifting function, k is a time domain index, $\Delta_m$ is a time varying delay, N is the number of symbols in a frame, burst period or symbol stream, n is an index within a frame, burst period or symbol stream and $X_n$ is an $n^{th}$ unshifted symbol.

9. The method of claim 6, wherein the delay periods vary according to the defined time varying function that is adjusted based on channel quality indicator feedback that describes channel conditions.

10. The method of claim 6, wherein the delay periods vary according to the defined time varying function that is not adjusted based on channel quality indicator feedback that describes channel conditions.

11. The method of claim 6, wherein the first symbol, second symbol, and third symbol are consecutive symbols of a same symbol stream.

12. The method of claim 6, wherein the third symbol is transmitted immediately after the second symbol that is transmitted immediately after the first symbol.

13. The method of claim 6, wherein the first symbol, second symbol, and third symbol are non-consecutive symbols of a same symbol stream.

14. The method of claim 13, wherein the first symbol and second symbol are separated by a number of symbols and the second symbol and the third symbol are separated by the number of symbols.

15. The method of claim 6, wherein the first symbol, second symbol, and third symbol are each transmitted in different frames.

16. A method for use in a wireless transmitter, the method comprising:
with a memory, storing a plurality of symbols each comprising a plurality of samples;
providing the plurality of samples of a first symbol of the plurality of symbols to one antenna of at least three antennas after a first delay period;
providing the plurality of samples of a second symbol of the plurality of symbols to the one antenna after a second delay period, wherein the first delay period and the second delay period are different, each of the symbols comprising a cyclic prefix of one or more samples, and wherein the delay periods that vary according to a defined time varying function are limited based on a number of symbols in a frame, burst period or symbol stream;
providing the plurality of samples of the first symbol to another of the at least three antennas after a third delay period; and
providing the plurality of samples of the second symbol to the another antenna after a fourth delay period,
wherein the first delay period, second delay period, third delay period, and fourth delay period are all different from each other, wherein the second delay period varies by n*β samples from the first delay period and the fourth delay period varies by n*(β+k) samples from the third delay period, where n is a location of a symbol in a symbol stream and β and k are constants, and wherein time diversity is provided even if a channel is not of itself time selective.

17. An apparatus for use in a wireless transmitter, the apparatus comprising:
means for storing a plurality of symbols each comprising a plurality of samples;
means for providing the plurality of samples of a first symbol of the plurality of symbols to one antenna of at least three antennas after a first delay period;
means for providing the plurality of samples of a second symbol of the plurality of symbols to the one antenna after a second delay period, wherein the first delay period and the second delay period are different, each of the symbols comprising a cyclic prefix of one or more samples, and wherein the delay periods that vary according to a defined time varying function are limited based on a number of symbols in a frame, burst period or symbol stream;
means for providing the plurality of samples of the first symbol to another of the at least three antennas after a third delay period; and means for providing the plurality of samples of the second symbol to the another antenna after a fourth delay period, wherein the first delay period, second delay period, third delay period, and fourth delay period are all different from each other, wherein the second delay period varies by n*β samples from the first delay period and the fourth delay period varies by n*(β+k) samples from the third delay period, where n is a location of a symbol in a symbol stream and β and k are constants, and wherein time diversity is provided even if a channel is not of itself time selective.

18. An article comprising:

a processor-readable memory having instructions thereon which are executable by a processor in a wireless transmitter to:

access a plurality of symbols each comprising a plurality of samples;

initiate providing the plurality of samples of a first symbol of the plurality of symbols to one antenna of at least three antennas after a first delay period;

initiate providing the plurality of samples of a second symbol of the plurality of symbols to the one antenna after a second delay period, wherein the first delay period and the second delay period are different, each of the symbols comprising a cyclic prefix of one or more samples, and wherein the delay periods that vary according to a defined time varying function are limited based on a number of symbols in a frame, burst period or symbol stream;

initiate providing the plurality of samples of the first symbol to another of the at least three antennas after a third delay period; and initiate providing the plurality of samples of the second symbol to the another antenna after a fourth delay period, wherein the first delay period, second delay period, third delay period, and fourth delay period are all different from each other, wherein the second delay period varies by n*β samples from the first delay period and the fourth delay period varies by n*(β+k) samples from the third delay period, where n is a location of a symbol in a symbol stream and β and k are constants, and wherein time diversity is provided even if a channel is not of itself time selective.

19. An apparatus for use in a multi-channel communication system, the apparatus comprising:

a plurality of antennas, comprising at least a first antenna and a second antenna;

a modulator; and a delay circuit coupled between the modulator and the plurality of antennas, the delay circuit to:

provide, to the first antenna, a first symbol comprising a first plurality of samples;

provide, to the second antenna, the first symbol after a first delay period;

provide, to the first antenna, a second symbol comprising a second plurality of samples;

provide, to the second antenna, the second symbol after a second delay period that is different than the first delay period;

provide, to the first antenna, a third symbol comprising a third plurality of samples; and provide, to the second antenna, the third symbol after a third delay period that is different than the first delay period and the second delay period, each of the symbols comprising a cyclic prefix of one or more samples, wherein the delay periods that vary according to a defined time varying function are limited based on a number of symbols in a frame, burst period or symbol stream, wherein the defined time varying function is sin(x) where x varies from 0 to N−1 where N is the number of symbols in a frame, burst period or symbol stream, and wherein time diversity is provided even if a channel is not of itself time selective, and wherein the first symbol, second symbol, and third symbol are modulated according to different carrier frequencies, and a scalar shift is provided to the first delay period, second delay period, and third delay period.

20. The apparatus of claim 19, wherein the first symbol, second symbol, and third symbol are consecutive symbols of a same symbol stream.

21. The apparatus of claim 19, wherein the third symbol is transmitted immediately after the second symbol that is transmitted immediately after the first symbol.

22. The apparatus of claim 19, wherein the first symbol, second symbol, and third symbol are non-consecutive symbols of a same symbol stream.

23. The apparatus of claim 19, wherein the first symbol and second symbol are separated by a number of symbols and the second symbol and the third symbol are separated by the number of symbols.

24. The apparatus of claim 19, wherein the first symbol, second symbol, and third symbol are each transmitted in different frames.

25. An apparatus for use in a multi-channel communication system, the apparatus comprising:

means for providing, to a first antenna, a first symbol comprising a first plurality of samples;

means for providing, to a second antenna, the first symbol after a first delay period;

means for providing, to the first antenna, a second symbol comprising a second plurality of samples;

means for providing, to the second antenna, the second symbol after a second delay period that is different than the first delay period;

means for providing, to the first antenna, a third symbol comprising a third plurality of samples; and means for providing, to the second antenna, the third symbol after a third delay period that is different than the first delay period and the second delay period, each of the symbols comprising a cyclic prefix of one or more samples, wherein the delay periods that vary according to a defined time varying function are limited based on a number of symbols in a frame, burst period or symbol stream, wherein the defined time varying function is sin(x) where x varies from 0 to N−1 where N is the number of symbols in a frame, burst period or symbol stream, and wherein time diversity is provided even if a channel is not of itself time selective, and wherein the first symbol, second symbol, and third symbol are modulated according to different carrier frequencies, and a scalar shift is provided to the first delay period, second delay period, and third delay period.

26. An article comprising:

a processor-readable memory having instructions thereon which are executable by a processor in device for use in a multi-channel communication system to:

initiate providing, to a first antenna, a first symbol comprising a first plurality of samples;

initiate providing, to a second antenna, the first symbol after a first delay period;
initiate providing, to the first antenna, a second symbol comprising a second plurality of samples;
initiate providing, to the second antenna, the second symbol after a second delay period that is different than the first delay period;
initiate providing, to the first antenna, a third symbol comprising a third plurality of samples; and
initiate providing, to the second antenna, the third symbol after a third delay period that is different than the first delay period and the second delay period, each of the symbols comprising a cyclic prefix of one or more samples, wherein the delay periods that vary according to a defined time varying function are limited based on a number of symbols in a frame, burst period or symbol stream, wherein the defined time varying function is $\sin(x)$ where x varies from 0 to $N-1$ where N is the number of symbols in a frame, burst period or symbol stream, and wherein time diversity is provided even if a channel is not of itself time selective, and wherein the first symbol, second symbol, and third symbol are modulated according to different carrier frequencies, and a scalar shift is provided to the first delay period, second delay period, and third delay period.

* * * * *